United States Patent
Wada et al.

(10) Patent No.: US 12,168,734 B2
(45) Date of Patent: Dec. 17, 2024

(54) CURABLE RESIN COMPOSITION

(71) Applicant: CANON KABUSHIKI KAISHA, Tokyo (JP)

(72) Inventors: Kyohei Wada, Tokyo (JP); Takayuki Hiratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 17/392,985

(22) Filed: Aug. 3, 2021

(65) Prior Publication Data

US 2021/0363377 A1     Nov. 25, 2021

Related U.S. Application Data

(63) Continuation of application No. PCT/JP2020/004231, filed on Feb. 5, 2020.

(30) Foreign Application Priority Data

Feb. 8, 2019    (JP) ................. 2019-021783
Jan. 21, 2020    (JP) ................. 2020-007357

(51) Int. Cl.
| | |
|---|---|
| *C08F 2/46* | (2006.01) |
| *B29C 64/129* | (2017.01) |
| *B33Y 10/00* | (2015.01) |
| *B33Y 70/00* | (2020.01) |
| *C08F 2/50* | (2006.01) |
| *C08G 61/04* | (2006.01) |
| *C09D 133/14* | (2006.01) |
| *B29K 33/00* | (2006.01) |
| *B29K 409/00* | (2006.01) |

(52) U.S. Cl.
CPC .......... *C09D 133/14* (2013.01); *B29C 64/129* (2017.08); *B33Y 10/00* (2014.12); *B33Y 70/00* (2014.12); *B29K 2033/08* (2013.01); *B29K 2409/00* (2013.01); *B29K 2995/0016* (2013.01); *B29K 2995/0082* (2013.01); *B29K 2995/0089* (2013.01)

(58) Field of Classification Search
CPC ....... C09D 133/14; C09D 4/06; C08F 279/02; C08F 285/00; C08F 220/14; C08F 220/32; C08F 220/40; C08F 222/103; C08F 222/1065; B29C 64/129; B29C 64/124; B33Y 10/00; B33Y 70/00; B29K 2995/0082; B29K 2995/0016; B29K 2995/0089; B29K 2409/00; B29K 2033/08
USPC ................ 522/64, 6, 71, 189, 184, 1; 520/1
See application file for complete search history.

(56) References Cited

U.S. PATENT DOCUMENTS

2003/0059708 A1 * 3/2003 Yamamura ............. B33Y 70/00 430/269

FOREIGN PATENT DOCUMENTS

| | | | |
|---|---|---|---|
| JP | 2006002110 A1 | | 1/2006 |
| JP | 2009062510 A | | 3/2009 |
| JP | 2014040585 A | | 3/2014 |
| JP | 5475173 A | | 4/2014 |
| JP | 2015063666 A | | 4/2015 |
| JP | 2015110772 | * | 6/2015 |
| JP | 2015110772 A | * | 6/2015 |
| JP | 2018131535 | * | 8/2018 |
| JP | 2018131535 A | * | 8/2018 |
| JP | 2019156932 A | | 9/2019 |
| WO | 2006057218 A1 | | 6/2006 |
| WO | 2016143559 A1 | | 9/2016 |
| WO | 2018020732 A1 | | 2/2018 |

OTHER PUBLICATIONS

Suzuki, JP 2015110772 Machine Translation, Jun. 18, 2015 (Year: 2015).*
Tsuchiya, JP 2018131535 Machine Translation, Aug. 23, 2018 (Year: 2018).*

* cited by examiner

*Primary Examiner* — Jessica Whiteley
(74) *Attorney, Agent, or Firm* — Canon U.S.A., Inc. I.P. Division

(57) ABSTRACT

A curable resin composition comprising; component (A) monofunctional 2-(allyloxymethyl) acrylic acid or its ester; component (B) a polyfunctional radically polymerizable compound having an isocyanurate ring; component (C) a radically polymerizable compound; component (D) rubber particles; and component (E) a radical polymerization initiator, the component (C) is a radically polymerizable compound different from the component (A) and the component (B); and when the sum of the component (A), the component (B) and the component (C) is 100 parts by mass, the component (B) is 20 parts by mass or more to 80 parts by mass or less and the component (C) is 0 parts by mass or more to 40 parts by mass or less.

25 Claims, No Drawings

CURABLE RESIN COMPOSITION

CROSS-REFERENCE TO RELATED APPLICATIONS

This application is a Continuation of International Patent Application No. PCT/JP2020/004231, filed Feb. 5, 2020, which claims the benefit of Japanese Patent Application No. 2019-021783, filed Feb. 8, 2019, and Japanese Patent Application No. 2020-007357, filed Jan. 21, 2020, all of which are hereby incorporated by reference herein in their entirety.

BACKGROUND OF THE INVENTION

Field of the Invention

The present invention relates to a curable resin composition, a cured product and a method for producing a cured product.

Description of the Related Art

An optical three-dimensional shaping method in which layers each obtained by curing liquid curable resin with energetically active light such as ultraviolet rays are laminated to obtain a three-dimensional shaped object has been intensively studied. In optical three-dimensional shaping method, optical three-dimensional shaped objects have been developed not only for prototyping to confirm the shape (rapid prototyping), but also for preparing molds (rapid tooling) and service parts (production of actual products and rapid manufacturing).

Accordingly, requirements for material properties (impact resistance, heat resistance, flexural modulus, etc.) of three-dimensional shaped objects have become more advanced, and physical properties equivalent to those of engineering plastics have recently been required.

Three-dimensional shaped objects made of a curable resin have become to be required to have a certain degree of heat resistance and impact resistance, especially high impact resistance. In order to achieve both high impact resistance and heat resistance, Japanese Patent Application Laid-Open No. 2014-040585 discloses a curable resin composition containing a specific radically polymerizable compound and a polyfunctional radically polymerizable compound. Japanese Patent Application Laid-Open No. 2015-110772 discloses a curable resin composition comprising a radically polymerizable compound and rubber particles.

However, from the curable resin composition disclosed in Japanese Patent Application Laid-Open Nos. 2014-040585 and 2015-110772, a cured product exhibiting sufficient impact resistance has not been obtained, while a cured product exhibiting high heat resistance has been obtained.

The present invention is directed to a curable resin composition which can provide a cured product excellent in heat resistance, impact resistance and flexural modulus.

SUMMARY OF THE INVENTION

The curable resin composition according to the present embodiment is characterized by comprising components (A) to (E):
- (A) monofunctional 2-(allyloxymethyl) acrylic acid or its ester;
- (B) a polyfunctional radically polymerizable compound having an isocyanurate ring;
- (C) a radically polymerizable compound;
- (D) rubber particles; and
- (E) a radical polymerization initiator, wherein the component (A) is represented by general formula (1)

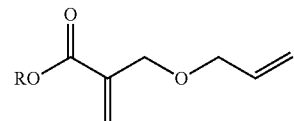

general formula (1)

[In general formula (1), R is hydrogen or a hydrocarbon group. The hydrocarbon group may have an ether bond, and the hydrocarbon group may have a substituent.];
the component (B) is represented by general formula (2)

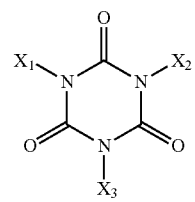

general formula (2)

[In general formula (2), two or more of $X_1$, $X_2$ and $X_3$ independently have one or more radically polymerizable groups.];
the component (C) is a radically polymerizable compound different from the component (A) and the component (B); and
when the sum of the component (A), the component (B) and the component (C) is 100 parts by mass, the component (B) is 20 parts by mass or more to 80 parts by mass or less and the component (C) is 0 parts by mass or more to 40 parts by mass or less.

Further features of the present invention will become apparent from the following description of exemplary embodiments.

DESCRIPTION OF THE EMBODIMENTS

The components (A) to (E) contained in the curable resin composition according to the present embodiment will be described in detail below.

<Component (A): Monofunctional 2-(Allyloxymethyl) Acrylic Acid or its Ester>

The monofunctional 2-(allyloxymethyl) acrylic acid or its ester as the component (A) is represented by general formula (1).

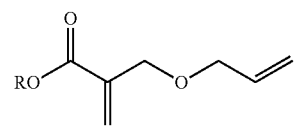

general formula (1)

In general formula (1), R is hydrogen or a hydrocarbon group. The hydrocarbon group may have an ether bond, and the hydrocarbon group may have a substituent.

Examples of the substituent of the hydrocarbon group represented by R include halogen atoms, cyano groups, trimethylsilyl groups, and the like. The hydrocarbon groups may be linear, branched, or have a cyclic structure.

Examples of the hydrocarbon group include a chain saturated hydrocarbon group, a chain unsaturated hydrocarbon group having two or more carbon atoms, an alicyclic hydrocarbon group having three or more carbon atoms, an aromatic hydrocarbon group having six or more carbon atoms, and the like. Preferably, the hydrocarbon group is a chain saturated hydrocarbon group having 1 to 20 carbon atoms, a chain unsaturated hydrocarbon group having 2 to 20 carbon atoms, an alicyclic hydrocarbon group having 3 to 20 carbon atoms, an aromatic hydrocarbon group having 6 to 20 carbon atoms, preferably a chain saturated hydrocarbon group having 1 to 20 carbon atoms, and more preferably a saturated hydrocarbon group having 1 to 10 carbon atoms.

The chain saturated hydrocarbon group may be a straight chain or branched hydrocarbon group, and is not particularly limited. For example, the groups such like methyl, ethyl, n-propyl, i-propyl, n-butyl, n-pentyl, s-pentyl, t-pentyl, neopentyl, n-hexyl, s-hexyl, n-heptyl, n-octyl, s-octyl, t-octyl, 2-ethylhexyl, capril, nonyl, decyl, undecyl, lauryl, tridecyl, millistil, pentadecyl, cetyl, heptadecyl, stearyl, nonadecyl, eicosyl, seryl, myricyl, and the like can be cited. The chain saturated hydrocarbon group may have an aromatic group as a substituent, for example, a benzyl group, a phenethyl group, or the like is preferable as the aromatic group.

The chain unsaturated hydrocarbon group is not particularly limited as long as it is a straight chain or branched hydrocarbon group containing at least one non-aromatic carbon-carbon unsaturated bond. Suitable groups include, for example, crotyl, 1,1-dimethyl-2-propenyl, 2-methylbutenyl, 3-methyl-2-butenyl, 3-methyl-3-butenyl, 2-methyl-3-butenyl, oleyl, linol, linolene, and the like.

The alicyclic hydrocarbon group is not particularly limited as long as it contains a saturated cyclic structure having three or more membered rings or an unsaturated cyclic structure that is not aromatic. Suitable groups include, for example, cyclopentyl, cyclopentylmethyl, cyclohexyl, cyclohexylmethyl, 4-methylcyclohexyl, 4-t-butylcyclohexyl, tricyclodecanyl, isobornyl, adamantyl, dicyclopentanyl, dicyclopentenyl, and the like.

The aromatic hydrocarbon group may be a hydrocarbon group containing an aromatic cyclic structure having six or more membered rings, and is not particularly limited, and a group such as phenyl, methylphenyl, dimethylphenyl, trimethylphenyl, 4-t-butylphenyl, diphenylmethyl, diphenylethyl, triphenylmethyl, cinnamyl, naphthyl, anthranil or the like is preferably used.

The hydrocarbon group containing an ether bond may have a structure in which an oxygen atom is inserted into at least one carbon-carbon bond constituting a chain saturated hydrocarbon group, a chain unsaturated hydrocarbon group, an alicyclic hydrocarbon group, or an aromatic hydrocarbon group, and is not particularly limited. Examples include linear ether groups such as methoxyethyl, methoxyethoxyethyl, methoxyethoxyethoxyethyl, 3-methoxybutyl, ethoxyethyl and ethoxyethoxyethyl; groups having alicyclic hydrocarbon groups and linear ether groups such as cyclopentoxyethyl, cyclohexyloxyethyl, cyclopentoxyethoxyethyl, cyclohexyloxyethoxyethyl and dicyclopentenyloxyethyl; groups having both aromatic hydrocarbon groups and linear ether groups such as phenoxyethyl and phenoxyethoxyethyl; and cyclic ether groups such as glycidyl, beta-methylglycidyl, beta-ethylglycidyl, 3,4-epoxycyclohexylmethyl, 2-oxetane methyl, 3-methyl-3-oxetane methyl, 3-ethyl-3-oxane methyl, tetrahydrofuranyl, tetrahydrofurfuryl, tetrahydropyranyl, dioxazolanyl, and dioxanyl.

Examples of the component (A) include 2-(allyloxymethyl) acrylic acid, 2-(allyloxymethyl) acrylic acid methyl ester, 2-(allyloxymethyl) acrylic acid ethyl ester, 2-(allyloxymethyl) acrylic acid n-propyl ester, 2-(allyloxymethyl) acrylic acid i-propyl ester, 2-(allyloxymethyl) acrylic acid n-butyl ester, 2-(allyloxymethyl) acrylic acid n-pentyl ester, 2-(allyloxymethyl) acrylic acid s-pentyl ester, 2-(allyloxymethyl) acrylic acid t-pentyl ester, 2-(allyloxymethyl) acrylic acid neopentyl ester, 2-(allyloxymethyl) acrylic acid n-hexyl ester, 2-(allyloxymethyl) acrylic acid s-hexyl ester, 2-(allyloxymethyl) acrylic acid n-heptyl ester, 2-(allyloxymethyl) acrylic acid n-octyl ester, 2-(allyloxymethyl) acrylic acid s-octyl ester, 2-(allyloxymethyl) acrylic acid t-octyl ester, 2-(allyloxymethyl) acrylic acid 2-ethylhexyl ester, 2-(allyloxymethyl) acrylic acid capril ester, 2-(allyloxymethyl) acrylic acid nonyl ester, 2-(allyloxymethyl) acrylic acid decyl ester, 2-(allyloxymethyl) acrylic acid undecyl ester, 2-(allyloxymethyl) acrylic acid lauryl ester, 2-(allyloxymethyl) acrylic acid tridecyl ester, 2-(allyloxymethyl) acrylic acid millistil ester, 2-(allyloxymethyl) acrylic acid pentadecyl ester, 2-(allyloxymethyl) acrylic acid cetyl ester, 2-(allyloxymethyl) acrylic acid heptadecyl ester, 2-(allyloxymethyl) acrylic acid stearyl ester, 2-(allyloxymethyl) acrylic acid nonadecyl ester, 2-(allyloxymethyl) acrylic acid eicosyl ester, 2-(allyloxymethyl) acrylic acid seryl ester, 2-(allyloxymethyl) acrylic acid merisyl ester, 2-(allyloxymethyl) acrylic acid crotyl ester, 2-(allyloxymethyl) acrylic acid 1,1-dimethyl-2-propenyl ester, 2-(allyloxymethyl) acrylic acid 2-methylbutenyl ester, 2-(allyloxymethyl) acrylic acid 3-methyl-2-butenyl ester, 2-(allyloxymethyl) acrylic acid 3-methyl-3-butenyl ester, 2-(allyloxymethyl) acrylic acid 2-methyl-3-butenyl ester, 2-(allyloxymethyl) acrylic acid oleyl ester, 2-(allyloxymethyl) acrylic acid linol ester, 2-(allyloxymethyl) acrylic acid linolene ester, 2-(allyloxymethyl) acrylic acid cyclopentyl ester, 2-(allyloxymethyl) acrylic acid cyclopentylmethyl ester, 2-(allyloxymethyl) acrylic acid cyclohexyl ester, 2-(allyloxymethyl) acrylic acid cyclohexylmethyl ester, 2-(allyloxymethyl) acrylic acid 4-methylcyclohexyl ester, 2-(allyloxymethyl) acrylic acid 4-t-butylcyclohexyl ester, 2-(allyloxymethyl) acrylic acid tricyclodecanyl ester, 2-(allyloxymethyl) acrylic acid isobornyl ester, 2-(allyloxymethyl) acrylic acid adamantyl ester, 2-(allyloxymethyl) acrylic acid dicyclopentanyl ester, 2-(allyloxymethyl) acrylic acid dicyclopentenyl ester, 2-(allyloxymethyl) acrylic acid phenyl ester, 2-(allyloxymethyl) acrylic acid methylphenyl ester, 2-(allyloxymethyl) acrylic acid dimethylphenyl ester, 2-(allyloxymethyl) acrylic acid trimethylphenyl ester, 2-(allyloxymethyl) acrylic acid 4-t-butylphenyl ester, 2-(allyloxymethyl) acrylic acid benzyl ester, 2-(allyloxymethyl) acrylic acid diphenylmethyl ester, 2-(allyloxymethyl) acrylic acid diphenylethyl ester, 2-(allyloxymethyl) acrylic acid triphenylmethyl ester, 2-(allyloxymethyl) acrylic acid cinnamyl ester, 2-(allyloxymethyl) acrylic acid naphthyl ester, 2-(allyloxymethyl) acrylic acid anthranil ester, 2-(allyloxymethyl) acrylic acid methoxyethyl ester, 2-(allyloxymethyl) acrylic acid methoxyethoxyethyl ester, 2-(allyloxymethyl) acrylic acid methoxyethoxyethoxyethyl ester, 2-(allyloxymethyl) acrylic acid 3-methoxybutyl ester, 2-(allyloxymethyl) acrylic acid ethoxyethyl ester, 2-(allyloxymethyl) acrylic acid ethoxyethoxyethyl ester, 2-(allyloxymethyl) acrylic acid cyclopentoxyethyl ester, 2-(allyloxymethyl) acrylic acid cyclohexyloxyethyl ester, 2-(allyloxymethyl) acrylic acid cyclopentoxyethoxyethyl ester, 2-(allyloxymethyl) acrylic acid cyclohexyloxyethoxyethyl ester, 2-(allyloxymethyl) acrylic acid dicyclopentenyloxyethyl ester, 2-(allyloxymethyl) acrylic acid phenoxyethyl ester, 2-(allyloxymethyl)

acrylic acid phenoxyethoxyethyl ester, 2-(allyloxymethyl) acrylic acid glycidyl ester, 2-(allyloxymethyl) acrylic acid beta-methylglycidyl ester, 2-(allyloxymethyl) acrylic acid beta-ethylglycidyl ester, 2-(allyloxymethyl) acrylic acid 3,4-epoxycyclohexylmethyl ester, 2-(allyloxymethyl) acrylic acid 2-oxetane methyl ester, 2-(allyloxymethyl) acrylic acid 3-methyl-3-oxetane methyl ester, 2-(allyloxymethyl) acrylic acid 3-ethyl-3-oxetane methyl ester, 2-(allyloxymethyl) acrylic acid tetrahydrofuranyl ester, 2-(allyloxymethyl) acrylic acid tetrahydrofurfuryl ester, 2-(allyloxymethyl) acrylic acid tetrahydropyranyl ester, 2-(allyloxymethyl) acrylic acid dioxazolanil ester, 2-(allyloxymethyl) acrylic acid dioxanyl ester, and the like.

As the component (A), a commercially available product, for example, AOMA (manufactured by Nippon Shokubai Co., Ltd.) or the like can be used.

The component (A) has a radical polymerization activity equal to or more than that of the acrylate ester in spite of the fact that the carbon-carbon double bond at the alpha-position of the carbonyl group in the ester structure has a sterically more crowded structure than the methacrylate ester. The component (A) polymerizes while cyclizing the carbon-carbon double bond at the alpha-position and the terminal double bond to form a main chain skeleton having repeating units of 5-membered ring ether structures having methylene groups on both sides. The polymer obtained from the polymerizable composition containing the component (A) is characterized by having excellent mechanical properties due to the unique main chain skeleton generated by the polymerization.

The content of the component (A) is preferably 20 parts by mass or more and 80 parts by mass or less, more preferably 20 parts by mass or more and 75 parts by mass or less, and still more preferably 20 parts by mass or more and 70 parts by mass or less, based on the total of 100 parts by mass of the component (A), the component (B) and the component (C). When the component (A) is 20 parts by mass or more, the impact resistance of the cured product is sufficient, and when the component (A) is 80 parts by mass or less, the heat resistance of the cured product is sufficient.

<Component (B): Polyfunctional Radically Polymerizable Compound Having an Isocyanurate Ring>

The polyfunctional radically polymerizable compound having an isocyanurate ring as the component (B) is represented by general formula (2).

general formula (2)

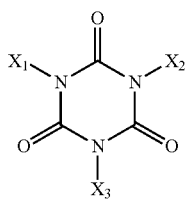

In general formula (2), two or more of $X_1$, $X_2$ and $X_3$ are independently radically polymerizable groups. Preferably, $X_1$, $X_2$ and $X_3$ are independently radically polymerizable groups. Examples of the radically polymerizable group include an allyl group, a (meth) acryloyl group, a (meth) acryloyloxyalkyl group, and the like. Here, the term "(meth) acryloyl (group)" means acryloyl (group) or methacryloyl (group). When two of $X_1$, $X_2$, and $X_3$ are radically polymerizable groups, the remaining one may include a condensable group such as a hydroxy group, an amino group, a carboxyl group, and a sulfonyl group, and an aromatic group such as a phenyl group, etc.

As the component (B), triallyl isocyanurate, diallyl isocyanurate, ethoxylated isocyanuric acid triacrylate, ethoxylated isocyanuric acid diacrylate, tris-(2-acryloxyethyl) isocyanurate modified with epsilon-caprolactone, and bis-(2-acryloxyethyl) isocyanurate modified with epsilon-caprolactone can be suitably used. A commercially available product may be used as the component (B). Examples include A-9300 (manufactured by Shin-Nakamura Chemical Co., Ltd.), A-9200 (manufactured by Shin-Nakamura Chemical Co., Ltd.), A-9300-1CL (manufactured by Shin-Nakamura Chemical Co., Ltd.), FA-731A (manufactured by Hitachi Chemical Co., Ltd.), TAIC (trademark) (manufactured by Mitsubishi Chemical Co., Ltd.), TMAIC (trademark) (manufactured by Mitsubishi Chemical Co., Ltd.), etc.

In order to exhibit the effect of the present invention, the content of the component (B) in the curable resin composition is 20 parts by mass or more and 80 parts by mass or less, preferably 25 parts by mass or more and 80 parts by mass or less, more preferably 30 parts by mass or more and 80 parts by mass or less, with respect to 100 parts by mass of the total of the component (A), the component (B) and the component (C). When the component (B) is less than 20 parts by mass, the cured product may not have sufficient heat resistance because the crosslinking density of the cured product is insufficient. Furthermore, when the crosslinking density is low in the process of changing the curable resin composition into a cured product, a sufficient curing rate cannot be obtained, and there is a possibility that the resin composition cannot be adapted to three-dimensional shaping. Therefore, it is not preferable that the component (B) is less than 20 parts by mass because the effect of the present invention may be impaired. On the other hand, when the component (B) exceeds 80 parts by mass, the crosslinking density of the cured product becomes excessive and the plastic deformation of the rubber particles (component (D)) is prevented, which tends to make it difficult to show the effect of improving the impact resistance of the cured product, and is not preferable because the effect of the present invention may be impaired.

<Component (C): Radically Polymerizable Compound>

A radically polymerizable compound (component (C)) different from component (A) and component (B) can be added to the curable resin composition according to the present embodiment. Component (C) includes, but is not limited to, commonly used monofunctional and polyfunctional radically polymerizable compounds, (meth) acrylates, compounds having polyrotaxanes, and the like. The component (C) can be added appropriately according to the characteristics of the desired cured product. Here, "(meth) acrylate" means acrylate or methacrylate.

The (meth) acrylate is a radically polymerizable compound having at least one (meth) acryloyl group, and polymerized by radicals generated by a radical polymerization initiator (component (E)) to be described later. The component (C) may be composed of one type or a plurality of types.

The number of (meth) acryloyl groups of the (meth) acrylate is not particularly limited. Examples of (meth) acrylates include, but are not limited to, monofunctional (meth) acrylates having one (meth) acryloyl group in the molecule, bifunctional (meth) acrylates having two (meth) acryloyl groups in the molecule, trifunctional (meth) acrylates having three (meth) acryloyl groups in the molecule, and tetra-or higher-functional (meth) acrylates having four or more (meth) acryloyl groups in the molecule. The (meth) acrylate may be a urethane (meth) acrylate having a urethane structure in the molecular structure or a polyester (meth) acrylate having a polyester structure in the molecular structure.

Specific examples of (meth) acrylates include: monofunctional (meth)acrylates such as methyl (meth) acrylate, ethyl (meth) acrylate, n-propyl (meth) acrylate, i-propyl (meth) acrylate, n-butyl (meth) acrylate, i-butyl (meth) acrylate, tert-butyl (meth) acrylate, n-pentyl (meth) acrylate, n-hexyl (meth) acrylate, cyclohexyl (meth) acrylate, n-heptyl (meth) acrylate, n-octyl (meth) acrylate, isooctyl (meth) acrylate, 2-ethylhexyl (meth) acrylate, nonyl (meth) acrylate, isonononyl (meth) acrylate, decyl (meth) acrylate, isodecyl (meth) acrylate, dodecyl (meth) acrylate, lauryl (meth) acrylate, stearyl (meth) acrylate, tridecyl (meth) acrylate, tridecyl (meth) acrylate, cyclohexyl (meth) acrylate, isobornyl (meth) acrylate, dicyclopentanyl (meth) acrylate, adamantyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, (meth) acrylic acid (3-ethyloxetan-3-yl) methane ester, and the like; bifunctional (meth) acrylates such as 1,4-butanediol di (meth) acrylate, 1,6-hexanediol di (meth) acrylate, 1,9-nonanediol di (meth) acrylate, tricyclodecanedimethanol (meth) acrylate, bisphenol A (poly) ethoxy di (meth) acrylate, bisphenol A (poly) propoxy di (meth) acrylate, bisphenol F (poly) ethoxy di (meth) acrylate, ethylene glycol di (meth) acrylate, and the like; trifunctional (meth) acrylates such as trimethylolpropane tri (meth) acrylate, trimethylol octane tri (meth) acrylate, trimethylolpropane polyethoxy tri (meth) acrylate, trimethylolpropane (poly) propoxy tri (meth) acrylate, trimethylolpropane (poly) ethoxy (poly) propoxy tri (meth) acrylate, pentaerythritol tri (meth) acrylate, and the like; and four or more functional (meth) acrylates such as ditrimethylolpropane tetra (meth) acrylate, pentaerythritol polyethoxytetra (meth) acrylate, pentaerythritol polyethoxytetra (meth) acrylate, pentaerythritol (poly) propoxytetra (meth) acrylate, pentaerythritol tetra (meth) acrylate, dipentaerythritoltetra (meth) acrylate, dipentaerythritol penta (meth) acrylate, dipentaerythritol hexa (meth) acrylate, and the like.

Specific examples of the urethane (meth) acrylate include, but are not limited to, polycarbonate-based urethane (meth) acrylate, polyester-based urethane (meth) acrylate, polyether-based urethane (meth) acrylate, caprolactone-based urethane (meth) acrylate, and the like. These urethane (meth) acrylates can be obtained by reacting an isocyanate compound obtained by reacting a polyol with a diisocyanate with a (meth) acrylate monomer having a hydroxyl group. Specific examples of the polyol include polycarbonate diol, polyester polyol, polyether polyol, polycaprolactone polyol, and the like.

The polyester (meth) acrylate is obtained, for example, by condensing a polycarboxylic acid and a polyol to obtain a polyester oligomer having a hydroxyl group at the terminal, and then esterifying the hydroxyl group at the terminal with acrylic acid.

A polyrotaxane having cyclic molecules having a (meth) acryloyl group, a chain molecule penetrating the plurality of cyclic molecules like a skewer, and sealing groups arranged at both ends of the chain molecule and preventing the elimination of the plurality of cyclic molecules can be contained. Commercial polyrotaxanes that can be used as the polyrotaxanes having a (meth) acryloyl group according to the present embodiment include, for example, SeRM SM3405P, SeRM SA3405P, SeRM SM3400C, SeRM SA3400C, SeRM SA2400C (all manufactured by Advanced Soft Materials Co., Ltd.).

The amount of the component (C) added is 0 parts by mass or more and 40 parts by mass or less, preferably 0 parts by mass or more and 30 parts by mass or less, based on the total of 100 parts by mass of the component (A), the component (B) and the component (C). When the component (C) is 40 parts by mass or more, the structure derived from the component (A) cannot exhibit sufficient impact resistance (toughness) in the cured product.

<Component (D): Rubber Particles>

In the curable resin composition according to the present embodiment, the impact resistance of the cured product can be improved by adding rubber particles (component (D)). The component (D) is not particularly limited, but as an example, butadiene rubber particles, styrene-butadiene rubber copolymer particles, acrylonitrile-butadiene copolymer rubber particles and the like can be used. Further, saturated rubber particles obtained by hydrogenating or partially hydrogenating the diene rubbers, crosslinked butadiene rubber particles, isoprene rubber particles, chloroprene rubber particles, natural rubber particles, silicon rubber particles, ethylene/propylene/diene monomer ternary copolymer rubber particles, acrylic rubber particles, acrylic/silicone composite rubber particles and the like are cited. These rubber particles may be used alone or in combination of two or more kinds. The curable resin composition preferably contains at least one kind of particles selected from butadiene rubber particles, crosslinked butadiene rubber particles, styrene/butadiene copolymer rubber particles, acrylic rubber particles and silicone/acrylic composite rubber particles from the viewpoint of improving impact resistance of the cured product.

The amount of the rubber particles (D) to be added in the curable resin composition is preferably 0.1 parts by mass or more and 50 parts by mass or less, more preferably 5 parts by mass or more and 40 parts by mass or less, based on the total of 100 parts by mass of the component (A), the component (B) and the component (C). If the content of the rubber particles (D) is within the above range, the cured product can achieve both good heat resistance and impact resistance (toughness).

The component (D) is preferably rubber particles having a multilayer structure (core-shell structure) comprising the rubber particles as a core portion and at least one shell layer covering the core portion.

The glass transition temperature of the polymer constituting the core portion is not particularly limited, but is preferably below 0° C., more preferably below −20° C., and still more preferably below −40° C. The impact resistance of the cured product tends to be improved by making the glass transition temperature of the polymer constituting the core portion 0° C. or less.

The glass transition temperature of the polymer constituting the core portion means a value calculated by the following equation of Fox (see Bull. Am. Phys. Soc., 1 (3) 123 (1956)). The following equation of Fox represents a case where the polymer constituting the core portion is a copolymer of a monomer i (monomer 1, monomer 2, . . . , and monomer n).

$$1/Tg = W1/Tg1 + W2/Tg2 + \ldots + Wn/Tgn$$

Tg: glass transition temperature (in K) of the polymer constituting the core portion Wi: mass fraction of monomer i with respect to the total amount of monomers constituting the polymer constituting the core portion Tgi: glass transition temperature (in K) of the homopolymer of monomer i.

For the glass transition temperature (Tgi) of the homopolymer, a value described in various literatures can be adopted, for example, a value described in "POLYMER HANDBOOK 3rd Edition" (published by John Wiley & Sons, Inc.) can be adopted. For those not described in the literature, the value of the glass transition temperature measured by the DSC method of a homopolymer obtained by polymerizing a monomer by a conventional method can be employed.

The polymer constituting the shell layer is preferably a polymer different from the polymer constituting the core portion. As the monofunctional monomer component of the polymer constituting the shell layer, (meth) acrylic acid esters such as (meth) acrylic acid methyl ester, (meth) acrylic acid ethyl ester, (meth) acrylic acid butyl ester and the like, maleimide, styrene, 2-(allyloxymethyl) acrylic acid ester and the like can be used, but are not limited thereto. As the polyfunctional monomer component of the polymer constituting the shell layer, divinylbenzene, allyl (meth) acrylate, ethylene glycol di (meth) acrylate, diallyl maleate, triallyl cyanurate, diallyl phthalate, butylene glycol diacrylate or the like can be used.

The glass transition temperature of the polymer constituting the shell layer is not particularly limited, but is preferably 0° C. or higher, more preferably 15° C. or higher, and still more preferably 30° C. or higher. When the glass transition temperature of the shell layer is 0° C. or higher, the viscosity of the composition does not increase and the composition tends to disperse well. The glass transition temperature of the shell layer is a value calculated by the above equation of Fox.

The rubber particles having a core-shell structure are obtained by coating the core portion with a shell layer. Examples of the method for covering the core portion with the shell layer include a method for coating the core portion with the shell layer and a method for graft polymerizing the shell layer on the surface of the core portion, and the method for graft polymerizing the shell layer on the surface of the core portion is more preferable.

The average particle size of component (D) is not particularly limited, but is preferably from 10 nm to 1000 nm, more preferably from 20 nm to 900 nm, and even more preferably from 30 nm to 800 nm. When the average particle diameter of the component (D) is 10 nm or more, the effect of improving the impact resistance of the cured product is easily obtained. When the average particle diameter is 1000 nm or less, the heat resistance of the cured product is sufficient.

<Component (E): Radical Polymerization Initiator>

In the curable resin composition according to the present embodiment, by adding a radical polymerization initiator (component (E)) such as a photoradical polymerization initiator, a cured product can be obtained by irradiating the composition with an active energy ray.

Photoradical polymerization initiators are mainly classified into intramolecular cleavage type and hydrogen abstraction type. In the intramolecular cleavage type radical polymerization initiator, the bond of a specific site is cleaved by absorbing light of a specific wavelength, and a radical is generated at the cleaved site to serve as a polymerization initiator and start polymerization of the radically polymerizable compound. On the other hand, in the case of the hydrogen abstraction type, light of a specific wavelength is absorbed, and the excited species undergo a hydrogen abstraction reaction from the surrounding hydrogen donor to generate radicals, which serve as a polymerization initiator and start polymerization of the radically polymerizable compound.

As the intramolecular cleavage-type photoradical polymerization initiator, an alkylphenone-based photoradical polymerization initiator, an acylphosphine-oxide-based photoradical polymerization initiator, and an oxime-ester-based photoradical polymerization initiator are known. These are the types in which bonds adjacent to the carbonyl group are alpha-cleaved to form radical species. Examples of the alkylphenone-based photoradical polymerization initiator include a benzyl methyl ketal-based photoradical polymerization initiator, an alpha-hydroxyalkylphenone-based photoradical polymerization initiator, and an aminoalkylphenone-based photoradical polymerization initiator. As specific compounds, 2,2'-dimethoxy-1,2-diphenylethane-1-one (Irgacure (trademark) 651, manufactured by BASF corp.) or the like is cited as a benzyl methyl ketal-based radical polymerization initiator, 2-hydroxy-2-methyl-1-phenylpropane-1-one (Darocures (trademark) 1173, manufactured by BASF corp.), 1-hydroxycyclohexylphenyl ketone (Irgacure (trademark) 184, manufactured by BASF corp.), 1-[4-(2-hydroxyethoxy) phenyl]-2-hydroxy-2-methyl-1-propane-1-one (Irgacure (trademark) 2959, manufactured by BASF corp.), 2-hydroxy-1-{4-[4-(2-hydroxy-2-methylpropionyl) benzyl]phenyl}-2-methylpropane-1-one (Irgacure (trademark) 127, manufactured by BASF corp.) or the like is cited as an alpha-hydroxyalkylphenone-based radical polymerization initiator, and 2-methyl-1-(4-methylthiophenyl)-2-morpholinopropane-1-one (Irgacure (trademark) 907, manufactured by BASF corp.), 2-benzylmethyl-2-dimethylamino-1-(4-morpholinophenyl)-1-butanone (Irgacure (trademark) 369, manufactured by BASF corp.) or the like is cited as an aminoalkylphenone-based photoradical polymerization initiator, but not limited thereto. 2,4,6-trimethylbenzoyldiphenylphosphine oxide (Lucillin (trademark) TPO, manufactured by BASF corp.), bis (2,4,6-trimethylbenzoyl)-phenylphosphine oxide (Irgacure (trade mark) 819, manufactured by BASF corp.) or the like is cited as an acylphosphine oxide-based photoradical polymerization initiator but not limited thereto. (2E)-2-(benzoyloxyimino)-1-[4-(phenylthio) phenyl]octane-1-one (Irgacure (trademark) OXE-01, manufactured by BASF corp.) or the like is cited as an oxime ester-based photoradical polymerization initiator but not limited thereto.

The hydrogen abstraction type radical polymerization initiator includes, but is not limited to, anthraquinone derivatives such as 2-ethyl-9,10-anthraquinone, 2-t-butyl-9,10-anthraquinone, and thioxanthone derivatives such as isopropylthioxanthone, 2,4-diethylthioxanthone.

Two or more kinds of photoradical polymerization initiators may be used in combination, or they may be used alone.

The amount of the photoradical polymerization initiator added is preferably 0.1 parts by mass or more and 15 parts by mass or less, more preferably 0.1 parts by mass or more and 10 parts by mass or less, based on the total of 100 parts by mass of the component (A), the component (B) and the component (C). When the amount of the photoradical polymerization initiator added is 0.1 parts by mass or more, polymerization of the curable resin composition becomes sufficient, and heat resistance of the cured product becomes sufficient. When the amount of the photoradical polymerization initiator added is 15 parts by mass or less, the molecular weight increases and the impact resistance of the cured product becomes sufficient.

In addition, a thermal radical polymerization initiator may be contained to cause the polymerization reaction in the heat treatment after the shaping. The thermal radical polymerization initiator is not particularly limited as long as it generates radicals by heating, and conventionally known compounds can be used, and for example, azo compounds, peroxides, persulfates and the like can be preferably used. Examples of the azo compound include 2,2'-azobisisobutyronitrile, 2,2'-azobis (methylisobutyrate), 2,2'-azobis-2,4-dimethylvaleronitrile, 1,1'-azobis (1-acetoxy-1-phenylethane) and the like. Examples of peroxides include benzoyl peroxide, di-t-butylbenzoyl peroxide, t-butylperoxypivalate, and di (4-t-butylcyclohexyl) peroxydicarbonate and the like. Examples of the persulfate include ammonium persulfate, sodium persulfate potassium persulfate and the like.

The amount of the thermal radical polymerization initiator added is preferably 0.1 parts by mass or more and 15 parts by mass or less, more preferably 0.1 parts by mass or more and 10 parts by mass or less, based on the total of 100 parts by mass of the component (A), the component (B) and the component (C). When the amount of the thermal radical polymerization initiator is 15 parts by mass or less, the molecular weight is increased and sufficient physical properties can be obtained.

<Additives>

The curable resin composition according to the present embodiment may contain various additives as other optional components within a range that does not impair the object and effect of the present invention. Such additives include epoxy resins, polyamides, polyamideimides, polyurethanes, polybutadienes, polychloroprene, polyethers, polyesters, styrene-butadiene block copolymers, petroleum resins, xylene resins, ketone resins, cellulose resins, fluorinated oligomers, silicone oligomers, and polysulfide oligomers; polymerization inhibitors such as phenothiazine, 2,6-di-t-butyl-4-methylphenol; polymerization initiator aid; leveling agent; wettability improving agent; surfactant; plasticizer; ultraviolet absorber; silane coupling agent; inorganic filler; pigments; dyes and the like.

<Method of Shaping Three-Dimensional Object>

The curable resin composition according to the present embodiment can be suitably used for a method for producing a cured product by optical three-dimensional shaping method (stereolithography). A method for producing a cured product using the curable resin composition according to the present embodiment will be described below.

As the stereolithography, a conventionally known method can be used. That is, the method includes a step of selectively irradiating each layer of the curable resin composition of the present embodiment with an active energy ray such as light to cure the curable resin composition such as photo-curing, and is repeated to prepare a cured product.

In the step of selectively irradiating each layer of the curable resin composition, the curable resin composition is selectively irradiated with active energy rays based on slice data of a desired cured product. The active energy ray to be irradiated to the curable resin composition is not particularly limited as long as the active energy ray can cure the curable resin composition according to the present embodiment. Specific examples of active energy rays include electromagnetic waves such as ultraviolet rays, visible rays, infrared rays, X-rays, gamma rays, laser rays, and particle rays such as alpha rays, beta rays, and electron rays. Among them, ultraviolet rays are most preferable from the viewpoint of the absorption wavelength of the radical polymerization initiator (component (E)) to be used and the cost of equipment introduction. The exposure amount of the active energy ray is not particularly limited, but is preferably from 0.001 J/cm$^2$ to 10 J/cm$^2$. If it is less than 0.001 J/cm$^2$, the curable resin composition may not be cured sufficiently, and if it is more than 10 J/cm$^2$, the irradiation time is prolonged and productivity is degraded.

The method of irradiating the curable resin composition with active energy rays is not particularly limited, and for example, when irradiating light as active energy rays, the following method can be employed. As a first method, a method of scanning the curable resin composition with the light two-dimensionally using the light converged in a point shape like a laser beam is mentioned. In this case, two-dimensional scanning may be performed by a stippling method or a line drawing method. The second method includes an area exposure method in which a projector or the like is used to irradiate the shape of the cross-sectional data with light. In this case, the active energy ray may be areally irradiated through a planar drawing mask formed by arranging a plurality of minute optical shutters such as a liquid crystal shutter or a digital micromirror shutter.

After the cured product is obtained by the above method, the surface of the obtained cured product may be washed with a detergent such as an organic solvent. Further, the obtained cured product may be subjected to light irradiation or heat treatment to perform post-curing for curing unreacted residual components remaining on the surface or inside of the cured product.

EXAMPLE

Hereinafter, the present invention will be described in detail with reference to Examples and Comparative Examples, but the present invention is not limited to these Examples.

Examples 1 to 3

The components used in Examples are as follows.

[Component (A)]
A-1: 2-(allyloxymethyl) acrylic acid methyl ester (AOMA, manufactured by Nippon Shokubai Co., Ltd.)

[Component (B)]
B-1: Ethoxylated isocyanuric acid triacrylate (manufactured by Shin-Nakamura Chemical Co., Ltd., A-9300) (tris[2-(acryloyloxy)ethyl]isocyanurate)

[Component (C)]
Urethane acrylate (KAYARAD UX-6101 manufactured by Nippon Kayaku Co., Ltd.)

[Component (D)]
Rubber Particles Prepared by the Following Process

An acetone dispersion of rubber particles having a core-shell structure was prepared. First, 370 parts by mass of latex (Nipol (trademark) LX 111 A2 manufactured by Nippon Zeon Co., Ltd.) (corresponding to 200 parts by mass of polybutadiene rubber particles) and 630 parts by mass of deionized water were loaded in a 2 L glass container, and the mixture was stirred at 60° C. for 60 minutes while performing nitrogen substitution. After adding 0.0096 parts by mass of EDTA, 0.0024 parts by mass of iron sulfate and 0.48 parts by mass of sodium formaldehyde sulfoxylate, a mixture of 35.28 parts by mass of graft monomer (methyl methacrylate (MMA), 35.28 parts by mass of 3-methyl-3-oxetanyl-methyl methacrylate (OXMA) and 0.119 parts by mass of cumene hydroperoxide (CHP) was added dropwise continuously over 2 hours to perform graft polymerization. After completion of dropping, the reaction was further stirred for 2 hours to complete the reaction, thereby producing rubber particles having a core-shell structure. 1000 parts by mass of acetone was introduced into a 2 L mixed bath, and the obtained rubber particles were charged while stirring. After the charging, a slurry liquid consisting of a floating aggregate and an aqueous layer partially containing an organic solvent was obtained. The resulting slurry was packed into a 250 mL centrifuge tube, centrifuged at 12000 rpm for 30 minutes at a temperature of 10° C., and the supernatant was removed. Acetone was added to the precipitated rubber particles to be redispersed, and the mixture was centrifuged again at 12000 rpm at 10° C. for 30 minutes, and then the supernatant was removed to obtain an acetone dispersion of the rubber particles. It was confirmed that MMA and OXMA were graft-polymerized on the surface of the rubber particles, because the rubber particles kept dispersibility in the acetone dispersion. The acetone dispersion of the obtained rubber particles was measured using a dynamic light scattering apparatus (Zetasizer Nano ZS manufactured by Malvern corp.). The average particle size of rubber particles obtained from the local maximum value of the particle size distribution curve (particle size-scattering intensity) was 0.32 μm.

[Component (E)]

Bis (2,4,6-trimethylbenzoyl)-phenylphosphine oxide (Irgacure (trademark) 819, manufactured by BASF corp.)

<Preparation of Curable Resin Composition>

Component (A), component (B), and component (E), or component (A), component (B), component (C), and component (E) were blended at the blending ratio shown in Table 1 and mixed uniformly. The formulation was further mixed with an acetone dispersion of component (D), and acetone as a volatile component was removed by a rotary evaporator to obtain a curable resin composition.

<Preparation of Cured Product for Test Specimens>

A cured product was prepared by the following method using the prepared curable resin composition. First, a mold having a length of 80 mm, a width of 10 mm, and a thickness of 4 mm was sandwiched between two pieces of quartz glass, and a curable resin was poured into the mold. The poured curable resin composition was irradiated with 5 mW/cm$^2$ of ultraviolet rays from both sides of the mold for 360 seconds each using an ultraviolet irradiation device (EXECURE 3000 manufactured by HOYA CANDEO OPTRONICS Co., Ltd.) to obtain a cured product (total energy of 3600 mJ/cm$^2$). Further, the obtained cured product was placed in a heating oven at 50° C. for 1 hour, placed in a heating oven at 100° C., and subjected to heat treatment for 2 hours to obtain a cured product.

<Evaluation of Impact Resistance>

A notch of 2 mm in depth and 45° was formed in the center of the obtained test piece by a notch forming machine ("Notching Tool A-4" manufactured by Toyo Seiki Seisaku-sho, Ltd.) in accordance with JIS K 7111. The specimen is then fractured using an impact tester ("IMPACT TESTER IT" manufactured by Toyo Seiki Seisaku-sho, Ltd.) at an energy of 2 J from the back of the notch. The energy required for fracture was calculated from the angle at which the hammer swung up after fracture when the hammer started swinging from the 150° position. This calculated value was used as an index of impact resistance as Charpy impact strength. The impact resistance was evaluated by the following criteria.

A (very good): Charpy impact strength is 6 kJ/m$^2$ or more.
B (good): Charpy impact strength is 5 kJ/m$^2$ or more and less than 6 kJ/m$^2$.
C (defective): Charpy impact strength is less than 5 kJ/m$^2$.

<Evaluation of Heat Resistance>

The heat resistance of the obtained specimens was tested using a deflection temperature under load testing machine (product name of "No. 533 HDT Tester 3M-2", manufactured by Toyo Seiki Seisaku-sho, Ltd.) in accordance with JIS K 7191-2. The temperature was raised from 25° C. by 2° C. per minute at a bending stress of 1.80 MPa. The temperature at which the deflection of the test piece reached 0.34 mm was used as the deflection temperature under load as an index of heat resistance. Heat resistance was evaluated based on the following criteria.

A (very good): Deflection temperature under load is 150° C. or more.
B (good): Deflection temperature under load is 80° C. or more and less than 150° C.
C (defective): Deflection temperature under load is less than 80° C.

<Evaluation of Flexural Modulus>

The flexural modulus of the obtained specimen was measured by using a tensile and compression tester (product name of "Tencilon Universal Material Testing Machine RTF-1250" manufactured by A & D Co., Ltd.) in accordance with JIS K 7171. Under the condition of 2 mm·min, the flexural modulus was calculated from the stress gradient in the specified strain interval (0.05-0.25%). The flexural modulus was evaluated by the following criteria.

A (very good): The flexural modulus is 2.0 GPa or more.
B (good): The flexural modulus is 1.6 GPa or more to less than 2.0 GPa.
C (poor): The flexural modulus is less than 1.6 GPa.

Comparative Examples 1 to 5

A curable resin composition was prepared in the same manner as in Example except that the following components were used as components (A) or (B) at the blending ratios shown in Table 1, and evaluated in the same manner as in Example.

A-2: methyl methacrylate (MMA manufactured by Tokyo Chemical Industry Co., Ltd.)
A-3: 2-hydroxyethyl methacrylate (Light Ester HO-250 (N) manufactured by Kyoeisha Chemical Co., Ltd.)
B-2: pentaerythritol tetraacrylate (Light acrylate PE-4A manufactured by Kyoeisha Chemical Co., Ltd.)
B-3: trimethylol propane trimethacrylate (manufactured by Tokyo Chemical Industry Co., Ltd.)
B-4: bisphenol A dimethacrylate (manufactured by Sigma Aldrich Corp.)

TABLE 1

| | | | Example | | | Comparative Example | | | | |
|---|---|---|---|---|---|---|---|---|---|---|
| Constituent components | | | 1 | 2 | 3 | 1 | 2 | 3 | 4 | 5 |
| Composition | Component (A) | A-1 | 50 | 40 | 42.5 | 0 | 0 | 50 | 50 | 50 |
| | Component (B) | B-1 | 50 | 60 | 42.5 | 50 | 50 | 0 | 0 | 0 |

TABLE 1-continued

| Constituent components | | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| | Component (C) | | 0 | 0 | 15 | 0 | 0 | 0 | 0 | 0 |
| | Component (D) | | 20 | 20 | 20 | 20 | 20 | 20 | 20 | 20 |
| | Component (E) | | 2 | 2 | 2 | 2 | 2 | 2 | 2 | 2 |
| Other components | A-2 | | 0 | 0 | 0 | 50 | 0 | 0 | 0 | 0 |
| | A-3 | | 0 | 0 | 0 | 0 | 50 | 0 | 0 | 0 |
| | B-2 | | 0 | 0 | 0 | 0 | 0 | 50 | 0 | 0 |
| | B-3 | | 0 | 0 | 0 | 0 | 0 | 0 | 50 | 0 |
| | B-4 | | 0 | 0 | 0 | 0 | 0 | 0 | 0 | 50 |
| Physical property | Impact resistance | Measured value (kJ/m$^2$) | 5.9 | 5.2 | 6.9 | 0.5 | 0.6 | 0.5 | 0.5 | 0.5 |
| | | Evaluation | B | B | A | C | C | C | C | C |
| | Heat resistance | Measured value (° C.) | 89 | 100 | 81 | 100 | 90 | 187 | 123 | 113 |
| | | Evaluation | B | B | B | B | B | A | B | B |
| | Flexural modulus | Measured value (GPa) | 2.3 | 1.8 | 1.7 | 2.2 | 2 | 2 | 1.6 | 2.2 |
| | | Evaluation | A | B | B | A | A | A | B | A |

From Table 1, when Example 1 using A-1 as the component (A) was compared with Comparative Examples 1 and 2 using A-2 or A-3 instead of A-1, it was found that the cured product of Example 1 was a curable composition that gave a cured product having high impact resistance (fracture toughness). When Examples 1 to 3 using B-1 as the component (B) were compared with Comparative Examples 3 to 5 using B-2, B-3 or B-4 instead of B-1, it was found that the cured product of Examples 1 to 3 was curable composition giving high impact resistance (fracture toughness). Only when a polyfunctional radically polymerizable compound having an isocyanurate ring (component (B)) is combined with rubber particles (component (D)), the high fracture toughness effect of rubber particles (component (D)) was appeared, and the cured product showed very good impact resistance, contrary to the expectation.

From the above results, it was found that a cured product having a good balance of high impact resistance (toughness), high heat resistance and high flexural modulus can be obtained when the composition contains a monofunctional 2-(allyloxymethyl) acrylic acid or its ester (component (A)), a polyfunctional radically polymerizable compound having an isocyanurate ring (component (B)), rubber particles (component (D)), and a radical polymerization initiator (component (E)), and that the cured product can be suitably used for optical three-dimensional shaping.

According to the present invention, a curable resin composition which can form a cured product excellent in heat resistance, impact resistance and flexural modulus and is suitable for three-dimensional shaping can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable resin composition comprising components (A) to (E):
   (A) monofunctional 2-(allyloxymethyl) acrylic acid or its ester;
   (B) a polyfunctional radically polymerizable compound having an isocyanurate ring;
   (C) a radically polymerizable compound;
   (D) rubber particles; and
   (E) a radical polymerization initiator,
   wherein the component (A) is represented by formula (1)

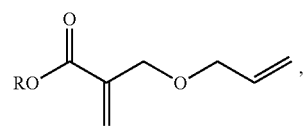

formula (1)

in formula (1), R is hydrogen or a hydrocarbon group, the hydrocarbon group optionally has an ether bond, and the hydrocarbon group optionally has a substituent;
the component (B) is represented by formula (2)

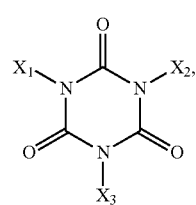

formula (2)

in formula (2), two or more of $X_1$, $X_2$ and $X_3$ independently have one or more radically polymerizable groups;
the component (C) is a radically polymerizable compound different from the component (A) and the component (B); and
when the sum of the component (A), the component (B) and the component (C) is 100 parts by mass, the component (B) is 20-50 parts by mass or more to 80 parts by mass or less and the component (C) is 0 parts by mass or more to 40 parts by mass or less.

2. The curable resin composition according to claim 1, wherein the R is a saturated hydrocarbon group having 1 or more to 20 or less carbon atoms.

3. The curable resin composition according to claim 1, wherein the component (A) is 2-(allyloxymethyl) acrylic acid methyl ester or 2-(allyloxymethyl) acrylic acid ethyl ester.

4. The curable resin composition according to claim 1, wherein the component (D) has a core-shell structure comprising a core portion and a shell layer.

5. The curable resin composition according to claim 4, wherein the shell layer of the core-shell structure is graft-polymerized on a surface of the core portion of the core-shell structure.

6. The curable resin composition according to claim 4, wherein the shell layer is composed of a polymer different from a polymer composing the core portion.

7. The curable resin composition according to claim 4, wherein the core portion comprises at least one material selected from butadiene rubber particles, crosslinked butadiene rubber particles, styrene/butadiene copolymer rubber particles, acrylic rubber particles, and silicone/acrylic composite rubber particles.

8. The curable resin composition according to claim 1, wherein the amount of the component (D) added is 0.1 parts by mass or more and 50 parts by mass or less based on a total of 100 parts by mass of the component (A), the component (B) and the component (C).

9. The curable resin composition according to claim 1, wherein the component (E) is a photoradical polymerization initiator.

10. A cured product obtained by curing the curable resin composition according to claim 1.

11. A method for producing a three-dimensional object comprising a step of curing the curable resin composition according to claim 1 in units of layers by irradiating the composition with an active energy ray based on slice data.

12. A curable resin composition comprising components (A) to (E):
(A) monofunctional 2-(allyloxymethyl) acrylic acid or its ester;
(B) a polyfunctional radically polymerizable compound having an isocyanurate ring;
(C) a radically polymerizable compound;
(D) rubber particles; and
(E) a radical polymerization initiator,
wherein the component (A) is represented by formula (1)

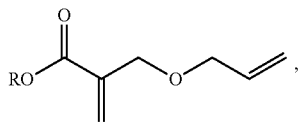

formula (1)

in formula (1), R is hydrogen or a hydrocarbon group, the hydrocarbon group optionally has an ether bond, and the hydrocarbon group optionally has a substituent;
the component (B) is represented by formula (2)

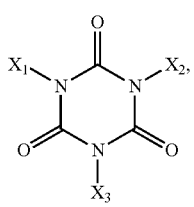

formula (2)

in formula (2), two or more of $X_1$, $X_2$ and $X_3$ independently have one or more radically polymerizable groups;
the component (C) is a radically polymerizable compound different from the component (A) and the component (B); and when the sum of the component (A), the component (B) and the component (C) is 100 parts by mass, the component (B) is 20 parts by mass or more to 80 parts by mass or less, the component (C) is 0 parts by mass or more to 40 parts by mass or less, and the component (D) is 0.1 parts by mass or more and 50 parts by mass or less.

13. The curable resin composition according to claim 12, wherein the R is a saturated hydrocarbon group having 1 or more to 20 or less carbon atoms.

14. The curable resin composition according to claim 12, wherein the component (A) is 2-(allyloxymethyl) acrylic acid methyl ester or 2-(allyloxymethyl) acrylic acid ethyl ester.

15. The curable resin composition according to claim 12, wherein the component (D) has a core-shell structure comprising a core portion and a shell layer.

16. The curable resin composition according to claim 15, wherein the shell layer of the core-shell structure is graft-polymerized on a surface of the core portion of the core-shell structure.

17. The curable resin composition according to claim 15, wherein the shell layer is composed of a polymer different from a polymer composing the core portion.

18. The curable resin composition according to claim 15, wherein the core portion comprises at least one material selected from butadiene rubber particles, crosslinked butadiene rubber particles, styrene/butadiene copolymer rubber particles, acrylic rubber particles, and silicone/acrylic composite rubber particles.

19. The curable resin composition according to claim 12, wherein the component (E) is a photoradical polymerization initiator.

20. The curable resin composition according to claim 12, wherein the sum of the component (A), the component (B) and the component (C) is 100 parts by mass, the component (B) is 50 parts by mass or more to 80 parts by mass or less.

21. A cured product obtained by curing the curable resin composition according to claim 12.

22. A method for producing a three-dimensional object comprising a step of curing the curable resin composition according to claim 12 in units of layers by irradiating the composition with an active energy ray based on slice data.

23. A curable resin composition comprising components (A) to (E):
(A) monofunctional 2-(allyloxymethyl) acrylic acid or its ester;
(B) a polyfunctional radically polymerizable compound having an isocyanurate ring;
(C) a radically polymerizable compound;
(D) rubber particles; and
(E) a radical polymerization initiator,
wherein the component (A) is represented by formula (1)

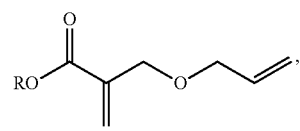

formula (1)

in formula (1), R is hydrogen or a hydrocarbon group, the hydrocarbon group optionally has an ether bond, and the hydrocarbon group optionally has a substituent;
the component (B) is represented by formula (2)

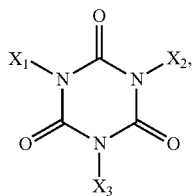

formula (2)

in formula (2), two or more of $X_1$, $X_2$ and $X_3$ independently have one or more radically polymerizable groups;

the component (C) is a radically polymerizable compound different from the component (A) and the component (B); and when the sum of the component (A), the component (B) and the component (C) is 100 parts by mass, the component (B) is 20 parts by mass or more to 80 parts by mass or less and the component (C) is 0 parts by mass or more to 30 parts by mass or less.

24. A cured product obtained by curing the curable resin composition according to claim 23.

25. A method for producing a three-dimensional object comprising a step of curing the curable resin composition according to claim 23 in units of layers by irradiating the composition with an active energy ray based on slice data.

* * * * *